Feb. 20, 1951 L. W. YOUNG ET AL 2,542,226
BLOWPIPE MACHINE
Original Filed Nov. 7, 1941 6 Sheets-Sheet 1

INVENTORS
LLOYD W. YOUNG
THOMAS S. JAMES
BY
ATTORNEY

Feb. 20, 1951    L. W. YOUNG ET AL    2,542,226
BLOWPIPE MACHINE

Original Filed Nov. 7, 1941                                       6 Sheets-Sheet 2

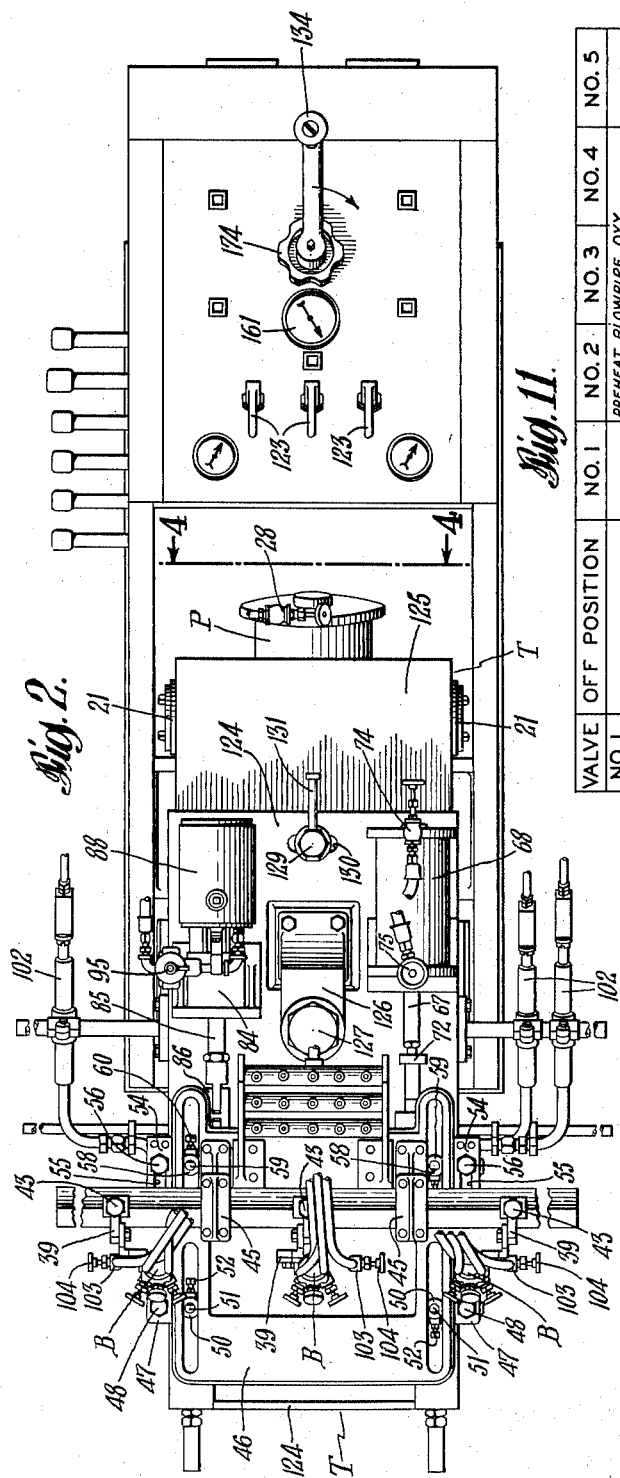

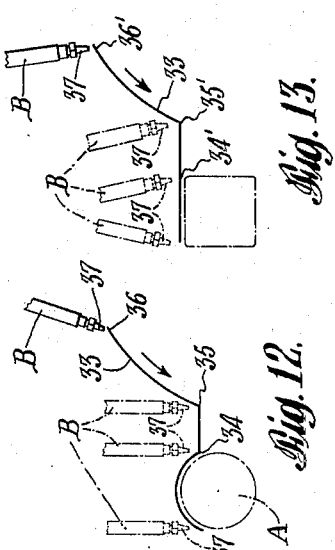

| VALVE | OFF POSITION | NO. 1 | NO. 2 | NO. 3 | NO. 4 | NO. 5 |
|---|---|---|---|---|---|---|
| NO. 1 | | PREHEAT BLOWPIPE OXY. | | | | |
| " 2 | | AUX. PREHEAT BLOWPIPE OXY. | | | | |
| " 3 | | | CUTTING OXY. | | | |
| " 4 | | | CUTTING OXY. | | | |
| " 5 | | | CUTTING OXY. | | | |
| " 6 | | | | PREHEAT BLOWPIPE ACET. | | |
| " 7 | | | | AUX. PREHEAT B/P ACET. | | |
| " 8 | | | | AIR VALVES FOR BLOWPIPE | | |
| " 9 | | | | TRAVEL CUTTING | | |
| " 10 | AIR VALVES FOR BLOWPIPE | | | | | |
| " 11 | TRAVEL RETRACT | | | | | |
| " 12 | | | | | AIR PILOT FOR HYDRAULIC SYSTEM | |
| " 13 | | | | | CARRIAGE DOWN ON WORK (AIR) | |
| " 14 | | | | | CARRIAGE DOWN ON WORK (AIR) | |
| " 15 | CARRIAGE LIFT (AIR) | | | | | |
| " 16 | CARRIAGE LIFT (AIR) | | | | | |

INVENTORS
LLOYD W. YOUNG
THOMAS S. JAMES
BY  *F. Freenewald*
ATTORNEY

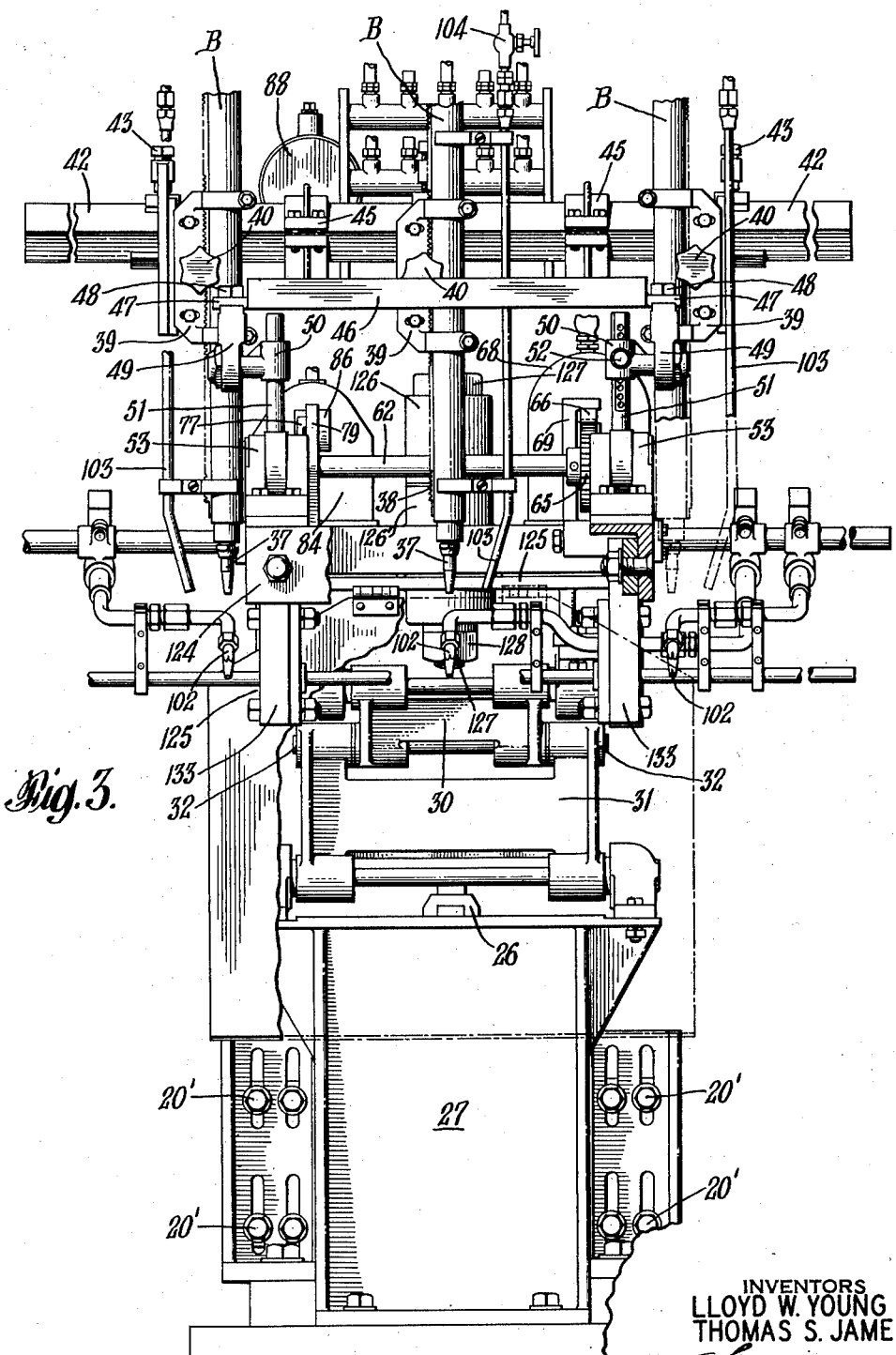

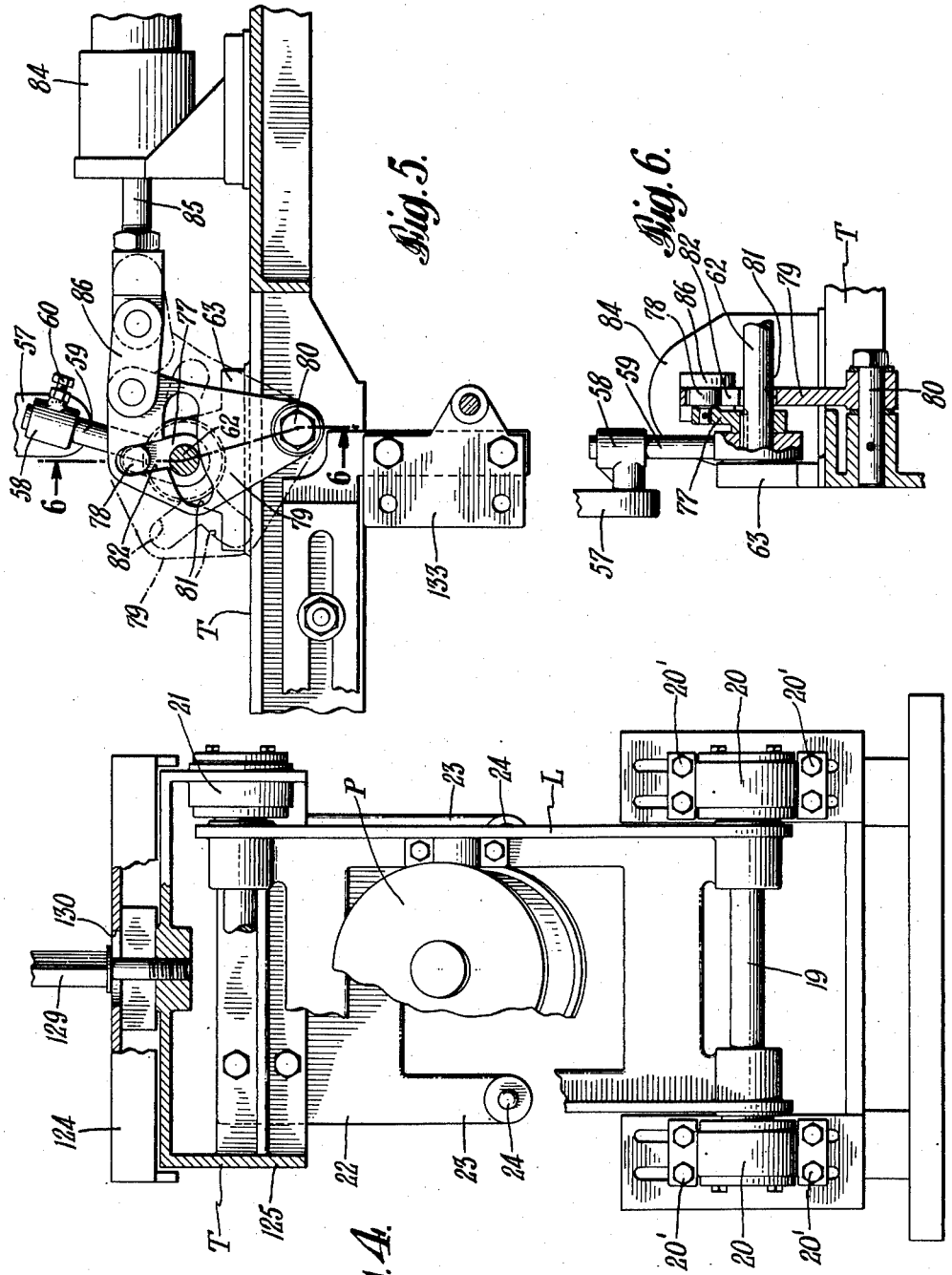

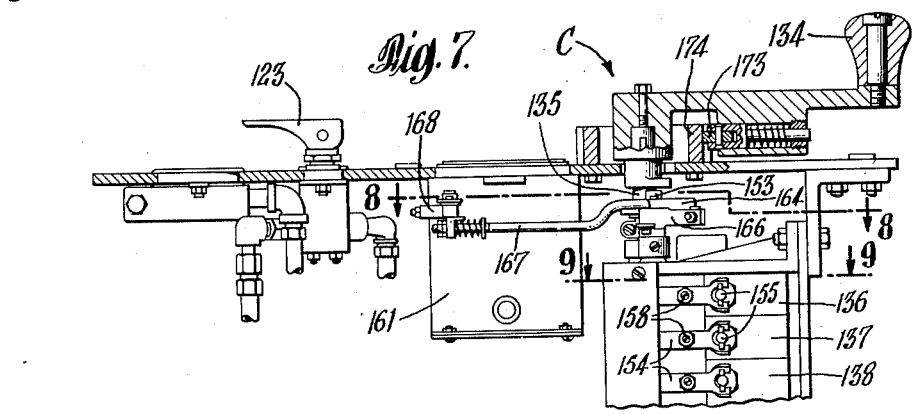

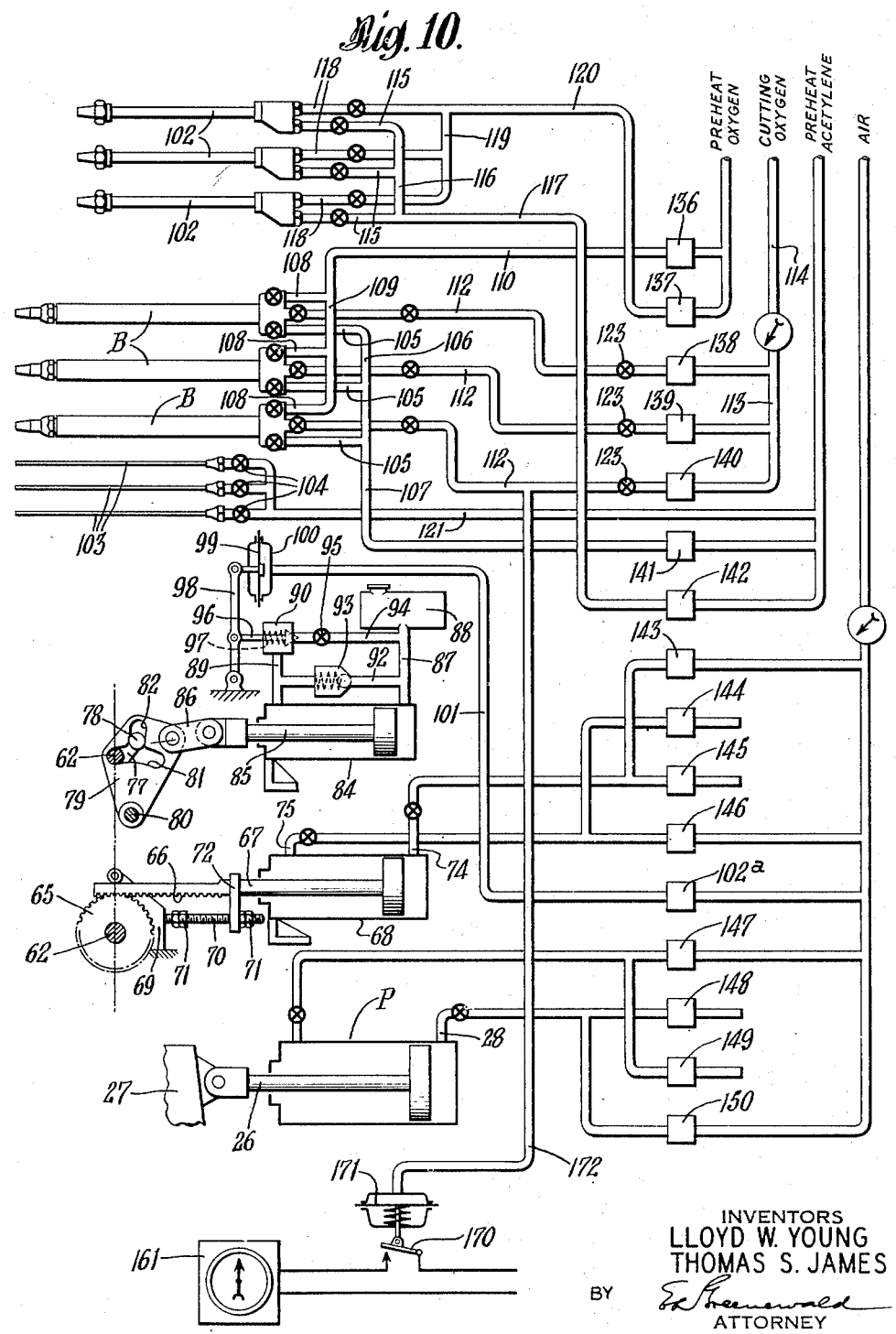

Patented Feb. 20, 1951

2,542,226

UNITED STATES PATENT OFFICE 2,542,226

BLOWPIPE MACHINE

Lloyd W. Young, Elizabeth, N. J., and Thomas S. James, Ben Avon, Pa., assignors to The Linde Air Products Company, a corporation of Ohio Continuation of application Serial No. 418,225, November 7, 1941. This application June 20, 1945, Serial No. 600,470

10 Claims. (Cl. 266—23)

This invention relates to blowpipe machines, and more particularly to a machine for thermochemically cutting ferrous metal bodies such as steel bars and billets of various sizes and shapes.

This application is a continuation of our copending application Serial No. 418,225, filed November 7, 1941, now abandoned.

Steel bars, billets, and the like, have previously been cut by blowpipe or torch-translating machines which move a gas-cutting torch discharging an oxidizing gas jet, transversely across a bar at a suitable cutting speed to thermochemically form a kerf therethrough. Such bars, and billets are usually of various sizes and may be either round or rectangular according to the type or types of products the mill is rolling. Such prior art machines, however, are specially constructed and arranged for cutting bars of a particular shape and a machine adapted for cutting round bars or billets is not suitable for cutting rectangular stock and vice versa. Such machines also cannot be readily and efficiently withdrawn to an inoperative position out of the way of other mechanisms and, generally, it has been necessary to provide a different machine for each commercial application.

It is the principal object of the present invention to provide an improved blowpipe propelling machine and to provide such a machine particularly adapted for thermochemically severing ferrous metal bodies such as round and/or rectangular steel bars, billets, and the like.

Other objects of this invention are to provide a blowpipe machine in which the blowpipe is movable both horizontally and through an arc toward and away from the workpiece; to provide such a machine in which the blowpipe is movable in substantially a straight line toward and away from the body to be severed in accordance with size of the body; and to provide such a machine in which the blowpipe is movable through an arc toward and away from a position substantially adjacent such body; to provide such a machine which is readily adaptable for severing bodies of different sizes; to provide such a machine in which the blowpipe is supported by a boom pivotally connected to a supporting link and extending toward the body to be severed; to provide such a machine which includes means for first moving the blowpipe supporting boom in substantially a straight line and for next moving the boom through an arc about its pivot connection to the supporting link; to provide such a machine in which the blowpipe propelling mechanism is partially supported by the body being severed; to provide such a machine which includes an improved blowpipe propelling mechanism adjustable to move at least the nozzle end of the blowpipe through a path substantially parallel to either a flat or arcuate surface; to provide such a machine which includes an improved means for controlling the rate of travel of the blowpipe; to provide such a machine which includes an improved mechanism for controlling the cycle of operation; to provide such a machine including one or more blowpipes supported by an articulated member so constructed and arranged for limited movement as to properly align the one or more blowpipes with the side of the body to be severed to properly position each blowpipe in a starting position; and to provide such a machine which is relatively simple and rugged in construction and economical to manufacture.

These and other objects and novel features will become apparent from the following description taken in connection with the accompanying drawings, in which:

Fig. 2 is a plan view of the machine of Fig. 1;

Fig. 3 is a front elevational view of the machine of Fig. 1;

Fig. 4 is a fragmentary, enlarged view, partially in section and with portions broken away, taken substantially along line 4—4 of Fig. 2;

Fig. 5 is a fragmentary, enlarged view of the cam mechanism for controlling the rate of travel of the blowpipes;

Fig. 6 is a fragmentary sectional view taken along line 6—6 of Fig. 5;

Fig. 7 is an enlarged view, partially in section, of the control mechanism;

Fig. 8 is a fragmentary plan view of the mechanism for resetting the stop-clock and is taken along line 8—8 of Fig. 7;

Fig. 9 is an enlarged fragmentary view, partially in section, of one of the cam-operated valving mechanisms and is taken along line 9—9 of Fig. 7;

Fig. 10 is a diagrammatic representation of the gas flow-controlling mechanism;

Fig. 11 is a table representing the sequence of valve operation for controlling the operation of the machine of Fig. 1;

Fig. 12 is a schematic representation of the movement of the blowpipe into an operative position adjacent a round bar and across the round bar; and, Fig. 13 is a schematic representation of the movement of the blowpipe through one complete cycle of operations when severing a rectangular bar.

Figure 1:
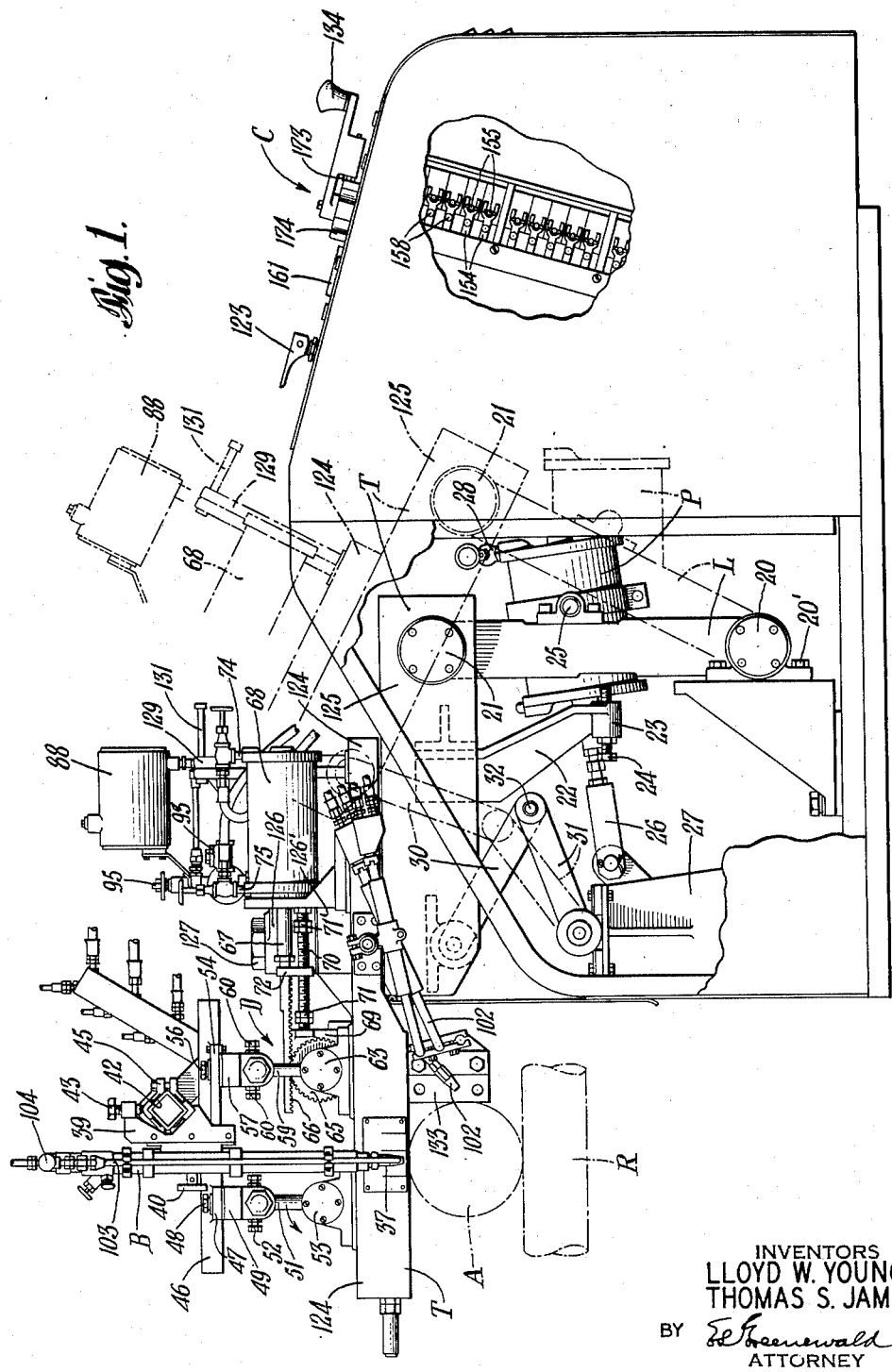
Fig. 1 is a side elevational view of a machine embodying the principles of the present invention with portions of the cover broken away to more clearly show the internal structure.

The blowpipe machine is preferably installed adjacent any conventional or suitable type of conveyor for moving the bars into a position to be severed. Referring to the drawings, the blowpipe machine is readily adaptable for moving one or more blowpipes, such as three similar cutting blowpipes B across different sizes of bodies such as round or rectangular steel bars or billets. A steel bar, such as the billet A may be supported by and propelled into position by a series of driven rollers R or may be propelled along such rollers into cutting position.

The blowpipe machine includes three blowpipes or torches B which are supported and propelled across a billet A by a mechanism D mounted on a boom T. The boom T is pivotally connected to a substantially vertical link L which is pivotally connected to the base of the machine. A pneumatic cylinder P is operatively connected to the link L to move the link about its pivot connection to the base to move the boom T and the blowpipes B horizontally and through an arc toward and away from the billet A. The machine is operated through suitable controls at a control table C which is located away from the billet and out of the zone of high temperature heat.

The lower end of the link L is mounted on a short shaft 19 pivotally supported in pillow blocks 20 bolted to the base of the machine by bolts 20' and the upper end of the link is similarly pivotally mounted in bearings 21 on the rear portion of boom T (see Fig. 4). By means of bolts 20', the link L can be vertically adjusted so that when a body which is greatly different in size is to be cut the boom can be maintained substantially horizontally. Normally the link L need not be vertically raised or lowered even though the body being cut is of a different size. As shown in Fig. 1, an arm 22 is rigidly connected to boom T and has an end portion 23 extending downwardly to a position adjacent the link L. A bolt 24 is threaded in the end 23 of arm 22 for longitudinal adjustment therein. The inner end of bolt 24 is adapted to engage the link L. The pneumatic cylinder P is pivotally mounted in bearings 25 on link L and has a piston rod 26 pivotally connected to the pedestal 27 in the base of the machine and when gas, such as air, is admitted under presure through the connection 28 to the head end of cylinder P, the link L is moved rearwardly through an arc about the axis of bearings 20. This rearward movement of link L first moves the boom T substantially horizontally toward the right, until the end of bolt 24 engages the link L to prevent any further movement of the link L and boom T relative to each other about the axis of bearings 21. Further rearward movement of the link L swings the boom T about the axis of bearings 20 to the position shown in broken lines in Fig. 1. When the bolt 24 engages the link, the link and the boom then swing as a rigid member about the axis of bearings 20. The amount of horizontal movement of boom T can be changed by adjusting the bolt 24.

A relatively wide link 30 is pivotally connected to the boom T and a second wide link 31 is pivotally connected to the pedestal 27. The outer ends of links 30 and 31 are pivotally connected at 32 and these links prevent lateral movement or side play of the boom T.

In Fig. 12, the solid line 33 substantially represents the line of movement of the lower gas discharging end of one of the blowpipes B through one cycle of operation. Point 34 on line 33 represents the location of the blowpipe when in the starting position for starting the cut at the side of the billet A. When air under pressure is admitted to the head end of cylinder P, the blowpipe B is moved substantially horizontally and substantially through a straight line from point 34 to point 35 and then is moved through an arc, as indicated, to position 36. The blowpipe is returned to the starting position through the same path of movement and if the next body to be severed is larger, the starting point of the cut is somewhere between points 34 and 35 depending on the size of the body. Thus, the blowpipes B can be adjusted to sever different sizes of bodies and can be readily swung up and away from a position adjacent the billet A.

Each of the similar blowpipes B, which may be of any conventional type, includes a nozzle 37 adapted to discharge a stream of oxidizing gas such as oxygen, and preferably adapted to discharge a plurality of jets of a combustible gas mixture, such as a mixture of oxygen and acetylene, which upon ignition burn to form preheat flames. Each blowpipe has a long rack 38 attached thereto and is vertically adjustably mounted in a holder 39 which includes a handwheel 40. Each handwheel is connected to a suitable spur gear (not shown) which meshes with the rack 38 so that when the handwheel 40 is turned the blowpipe is raised or lowered in its holder 39. Each holder 39 is slidingly mounted on a common hollow rectangular tube 42 and includes a locking bolt 43. With the bolt 43 loosened, the holder 39 can be adjusted along the tube 42 and the bolt can then be tightened to lock the holder in position. Thus each blowpipe is vertically adjustable and the distance between the blowpipes can be readily adjusted for severing different lengths.

The blowpipe supporting tube 42 is supported in the so-called "diamond position" by a pair of brackets 45 extending upwardly from plate 46. On each opposite forward side of plate 46 there is an ear 47 through which extends a bolt 48 for fastening thereto a depending bracket 49 in which is pivotally mounted a sleeve member 50. Each sleeve 50 is adjustably mounted on a link 51 and includes a bolt 52 for locking the sleeve in position. The links 51 are pivotally mounted in bearings 53 and support the forward end of the plate 46. On the rear portion of plate 46 there are a pair of ears 54 each containing an elongated slot 55 through which extends a bolt 56 for adjustably fastening thereto a bracket 57. Each bracket 57 is both pivotally and adjustably connected by a sleeve 58 to a link 59 in the same manner as bracket 49 is connected by sleeve 50 to link 51. As partially shown in Fig. 5, in each bracket 57 there is pivotally mounted a sleeve member 58 which is adjustably mounted on a link 59. Each sleeve 58 contains a bolt 60 for locking it in the desired position. The two links 59 are connected to a shaft 62 pivotally mounted in bearings 63 on boom T so that the links 59 and shaft 62 move in unison. On the shaft 62 there is mounted a spur gear 65 adapted to mesh with the rack 66 attached to or formed as a part of the piston rod 67 of cylinder 68. A rigid member 69 maintains the rack 66 in engagement with the spur gear 65. A long screw 70 is mounted in a fixed position below the rack 66 and has thereon spaced adjustable nuts 71. A downwardly extending finger 72 is connected to piston rod 67 and has an enlarged hole in its lower end through which the screw 70 extends so that the nuts 71 limit the stroke of the piston rod and limit the movement of the blowpipes B. By adjusting the distance between the nuts 71 the stroke of the blowpipes can be readily varied in accordance with the size of the work. Thus, when air under pressure is admitted through connection 74 to the head end of cylinder 68, the gear 65 is rotated in an anti-clockwise direction to move the blowpipes B toward the left across the billet A. When air under pressure is admitted through connection 75 to the rod end of cylinder 68, the piston 67 is retracted to turn the gear 65 in a clockwise direction and move the blowpipes B back to the starting position as indicated at 34 in Fig. 12.

In Fig. 1 the blowpipes B are shown substantially midway of the cut. If the links 51 and 59 are swung through an arc at a constant arcuate speed the horizontal speed of the blowpipe will not be uniform. The blowpipe will move faster at the center portion of the cut when the links 51 and 59 are substantially vertical and will move slower on the starting and finishing ends of the cut. Means are provided for controlling the speed of rotation of shaft 62 whereby the blowpipes B are moved at a predetermined varying arcuate speed. On the shaft 62 there is mounted a relatively short crank arm 77 having a roller 78 pivotally mounted in its outer end. As shown more clearly in Figs. 5, 6, and 10 a cam 79 is pivotally mounted on a fixed pin 80. A substantially T-shaped slot is formed in the cam 79. The shaft 62 extends through the arcuate portion 81 of the slot which permits cam 79 to swing through an arc about the axis of pin 80. The roller 78 engages a straight portion 82 of the slot. As is more fully hereinafter described the arcuate movement of the cam 79 is retarded so as to cause the shaft 62 and crank 77 to rotate at a non-uniform speed which in turn causes the blowpipes B to move at a non-uniform arcuate speed.

A retarding cylinder 84 is mounted on the boom T and has a piston rod 85 which is connected by means of a link 86 to cam 79. As the shaft 62 is rotated in an anti-clockwise direction to move the blowpipe B across the billet, the piston rod 85 is moved toward the left and as the shaft 62 is rotated in a clockwise direction to return the blowpipe to the starting position, the piston rod 85 is moved toward the right.

As shown diagrammatically in Fig. 10 the head end of the hydraulic cylinder 84 communicates through a tube 87 with a fluid reservoir tank 88. The rod end of cylinder 84 communicates through a tube 89 with a valve 90. Tubes 87 and 89 are connected by a tube 92 having a ball check valve 93 therein which prevents fluid flowing from the rod end of cylinder 84 through tube 92 to the head end of the cylinder but permits fluid to flow substantially freely from the head end to the rod end of cylinder 84. Tube 94 is connected between valve 90 and tube 87 and is provided with an adjustable metering valve 95 for controlling the rate of flow of fluid from the rod end to the head end of cylinder 84 in accordance with the size of the workpiece being severed. The valve stem 96 of valve 90 is normally held in closed position by a spring 97 and is connected to a lever 98, the outer end of which is connected to diaphragm 99 of a diaphragm motor 100 which communicates through line 101 and valve 102 with a source of air or other gas under pressure.

With the valve 90 closed, fluid cannot flow from the rod end of cylinder 84. Thus, when air is admitted under pressure to the head end of cylinder 68 to rotate the shaft 62 in an anti-clockwise direction the valve 102 must be opened to move the diaphragm 99 and the valve stem 96 toward the left to open valve 90. With valve 90 open, the rate of flow of fluid from the rod end of cylinder 84 is controlled by the adjustable metering valve 95 which normally is adjusted prior to the starting of a cut in accordance with the size of the workpiece. Cylinder 84 retards the speed of rotation of shaft 62. At the start of the cut the roller 78 is in the lower portion of slot 82 as shown in Fig. 10. As the shaft 62 rotates in an anti-clockwise direction the cam roller 78 moves upwardly toward a vertical position and moves longitudinally in the slot 82 to progressively increase the retarding leverage on shaft 62 so that the shaft 62 rotates progressively slower as the center of the cut is approached. As the shaft 62 continues to rotate the cam roller 78 moves downwardly toward a horizontal position and moves longitudinally in the block 82 to progressively decrease the retarding leverage so that the shaft 62 rotates progressively faster during the last half of the cut. The pin 80 is not directly below the shaft 62 so that at the end of the cut the leverage on shaft 62 is greater than at the start of the cut and this substantially compensates for the tendency of the weight supported by the links to retard the blowpipe speed during the first half of the cut and to increase the blowpipe speed during the last half of the cut. The blowpipe B may be moved at a slightly higher speed at the finishing end than at the starting end of the cut. While the blowpipes may be moved across the workpiece at a speed varied substantially according to the changes in the thickness of the work, the blowpipe rate of travel is not varied exactly in accordance with the thickness in this apparatus. When the cut has been completed air under pressure is admitted to the rod end of cylinder 68 to rotate the shaft 62 in a clockwise direction. As the shaft 62 rotates in a clockwise direction the piston rod 85 is moved toward the right and the fluid pressure in the head end of the cylinder 84 causes the check valve 93 to automatically open to permit substantially free flow of fluid from the head end to the rod end of the cylinder, thus the blowpipes B are rapidly returned to the starting position.

Normally when severing round bars or billets the blowpipe supporting links 51 and 59 are swung through an arc of approximately 140° to move the blowpipes completely across the bar. If desirable this arc may be increased or decreased. When the propelling mechanism is adjusted to move the blowpipe across a flat surface as shown in United States Letters Patent issued May 19, 1942 to L. W. Young and as shown in Fig. 13, the links 51 and 59 are moved through a relatively small arc of about 10° to 15°. The primary purpose of nuts 71 is to reduce the stroke of piston 67 and the arc through which the links are swung. When the blowpipes are moved across a flat surface the roller 78 is in the upper portion of the slot 82 during the entire cutting cycle so that the retarding leverage on shaft 62 is more nearly constant and the blowpipes B are moved at a more nearly constant speed.

Three preheating blowpipes 102 are mounted on the boom T for aiding in preheating a starting zone to the oxygen ignition temperature. Each blowpipe 102 aids the preheating flames discharged by the corresponding cutting blowpipe B to heat a starting zone and after the cut is started, the flow of gases are preferably shut-off to the preheating blowpipes. When cutting a hot bar the preheating blowpipe may be eliminated and while the preheating blowpipes may be eliminated when severing cold bars, they materially reduce the preheating period so that more cuts may be made during a given period. As shown more clearly in Figs. 1, 3, and 10 a tube 103 is attached to the side of each blowpipe B, and each tube is connected through a valve 104 to a source of combustible gas, such as acetylene. The tubes 103 each continuously discharges a stream of a combustible gas mixture such as a mixture of acetylene and air which burns substantially continuously. These flames serve as pilot flames or ignitors for the preheating gases discharged from the cutting blowpipe B and the corresponding preheating blowpipe 102.

As shown diagrammatically in Fig. 10, suitable hose and valve connections are provided for supplying gases to each of the blowpipes B and 102 and to the lighter 103. Each cutting blowpipe B is connected through a hose 105 with an acetylene header 106 which is in turn connected by a hose 107 to a source of acetylene gas and is connected through a hose 108 with a header 109 which is in turn connected by a hose 110 to a source of combustion supporting gas, such as oxygen. The preheat acetylene and oxygen are mixed in the blowpipes and discharged as jets of a combustible gas mixture which upon ignition burn to form preheating flames. Each blowpipe B is connected by a hose 112 with header 113 which communicates through hose 114 with a source of cutting oxygen. A manually operable valve 123 is provided for quickly shutting off the flow of oxygen to each blowpipe B. Each preheating blowpipe 102 is provided with a length of hose 115 which is connected to a header 116 which is connected through a hose 117 with a source of acetylene. Each blowpipe 102 is also connected to a length of hose 118 connected to a common header 119 which communicates through a hose 120 with a source of preheat oxygen. The ignitors or pilot torches 103 are all supplied with acetylene by a hose 121 which is connected to a suitable source of supply.

Referring more particularly to Figs. 1 to 4 inclusive, the boom T is articulated to permit alignment of the blowpipes B relative to the side of the billet A. The boom T comprises a front member 124 adapted to engage the billet A and a rear member 125. A sleeve 126 extends through an opening in member 124 and is fastened to the member 125. The sleeve 126 is coextensive with a hollow boss 126' formed on member 124 and a bolt 127 extends through sleeve 126 and boss 126' of member 124. The bolt 127 has a nut 128 on its lower end which normally is relatively loose so that the member 124 can swing about the vertical axis of bolt 127. A bolt 129 extends through an arcuate slot 130 in member 124 and is threaded in the member 125. A bar 131 is provided in the upper end of bolt 129 so that if desirable, the operator can readily tighten bolt 129 to prevent movement of member 124 relative to member 125. Normally the bolt 129 is relatively loose so that the boom T is articulated and the slot 130 limits movement of member 124 relative to member 125. Two spaced apart, downwardly depending fingers 133 are bolted to member 124 and are adapted to engage the side of the billet A. As will be more fully hereinafter described, when the boom T is urged toward the left the fingers 133 are urged into engagement with the side of the workpiece. The fingers 133 not only limit the movement of the boom T toward the left but cause the member 124 to move relative to member 125 to maintain the blowpipes B in a plane substantially perpendicular and parallel with the longitudinal axis of the workpiece.

As shown more particularly in Figs. 2 and 7 to 10, a control table C is provided at which the operator can control the machine during a complete cycle of operations. At the control table C, a control handle 134 is provided. The handle 134 is connected to the upper end of a relatively long cam shaft 135 on which are mounted a plurality of cams each for actuating a corresponding one of the valves 102a and 136 to 150 which are shown diagrammatically in Fig. 10. All these valves and the cam mechanism for actuating each of them are substantially similar and only one will be described in detail. Referring more particularly to Fig. 9, a cam 151 is mounted on the shaft 135. A cam follower 152 is mounted on a vertical rod 153. A corresponding arm 154 is also mounted on rod 153 and is connected to a valve stem 155 of valve 136 which is provided with inlet and outlet connections 156 and 157. An adjustable screw 158 is threaded in arm 154 for engagement with a boss 159 on the follower 152. When the shaft 135 is rotated in a clockwise direction, the cam 151 moves cam follower 152 and the arm 154 in a clockwise direction about the rod 153 which in turn moves the valve stem 155 outwardly to open the valve 136.

All of the valves 102a, and 136 to 150 are substantially similar to valve 136 and are similarly operated by similar cams and will not be described individually in detail.

An electrical stop clock 161 is provided in the control table C. On the lower end of shaft 135 there is fastened an arm 162 adapted to actuate a limit switch 163 electrically connected in the electrical circuit of the stop clock 161. As will be more fully hereinafter described, when the cutting oxygen is turned on by moving the controller handle 134 in a clockwise direction, the limit switch 163 is actuated to complete the electrical circuit to the stop clock 161 so that the clock starts running. When the handle 134 has been further moved in a clockwise direction to turn off the cutting oxygen, the limit switch 163 is opened to stop the clock 161 which until reset, indicates the time required to sever the workpiece. As shown more clearly in Fig. 8, a cam 164 is mounted on shaft 135 and is adapted to engage a cam follower 165 mounted on rod 153. The cam follower is operatively connected through arm 166, link 167 and arm 168 to the clock 161. The cam 164 is so positioned on shaft 135 as to move the cam follower 165 immediately before the cutting oxygen is turned on. Movement of the follower 165 moves the arm 168 to reset the clock 161 to a zero reading. Thus, up until the time a cut is started, the operator has a visual indication of the time required to make the previous cut which enables him to more readily control the operation of the machine and may serve as a reminder as to how long a time the cutting oxygen should be left on.

In Fig. 10, an alternative arrangement is shown which eliminates the limit switch 163. A normally open switch 170 is provided in the electrical circuit of the clock 161 and is connected to a diaphragm 171. A cutting oxygen line 172 communicates with one of the hose 112 so that when the cutting oxygen is turned on for the blowpipes B, the diaphragm 172 is moved to close switch 170 and start the clock. When the cutting oxygen is turned off the pressure drops in line 172 and switch 170 opens to stop the clock 161. In this alternative arrangement, the clock 161 is reset by movement of the controller handle as described above. To complete a cycle of operations, the controller handle 134 is moved through six positions, including an off position. The handle 134 is movably held in the different positions by a spring pressure roller 173 which engages a starwheel 174.

Referring to Figs. 1 to 13 and more particularly to Figs. 10 to 13, the cycle of operations is substantially as follows:

With the control handle 134 in the off position all of the actuating valves are closed except valves 145 and 146 and valves 149 and 150 which are open. The valve 145 opens the head end of the blowpipe propelling cylinder 68 to the atmosphere and the open valve 146 admits air under pressure to the rod end of cylinder 68. With valves 149 and 150 open, air under pressure is admitted to the head end of cylinder P and the rod end is opened to the atmosphere so that when the controller handle 134 is in the off position, the blowpipes are retracted and the boom T is in the raised position as indicated in broken lines in Fig. 1. With the boom T in the raised position the blowpipes B are in the position 36 or 36' as shown in Figs. 12 or 13.

For a bar to be severed the effective length of links 51 and 59 and the valve 95 must all be adjusted in accordance with the size of the bar to be cut. The blowpipe controlling device must also be correctly adjusted for severing either a round or square bar, as the case may be. Assuming that all such adjustments have been made, the controller handle 134 is moved from the off position to the first position and during this movement valves 149 and 150 are closed and valves 147 and 148 are opened to admit air under pressure to the rod end of cylinder P and to open the head end to the atmosphere. When the valves 149 and 150 are closed the boom T tends to swing downwardly under the influence of gravity and the opening of valves 147 and 148 positively moves and urges the boom T into engagement with the bar to be severed and also moves and urges the link L, the boom T and the fingers 133 toward the left so that the fingers engage the side of the workpiece as shown in Fig. 1. With the controller handle in the first position, the blowpipes are in the position indicated at 34 and 34'. As the controller is moved from the first to the second position, valves 137 and 142 are opened to turn on the preheat oxygen and preheat acetylene for the preheating blowpipes 102, and the valves 136 and 141 are opened to turn on the preheat gases for the cutting blowpipes B. The valves 143 and 144 are also opened to admit air under pressure to the head end of the blowpipe propelling cylinder 68 but as the valve 90 is closed the blowpipes B do not move. After a short pause for preheating starting zones to the oxygen ignition temperature the controller handle 134 is moved to the third position. As the controller handle 134 is moved to the third position, valves 137 and 142 are closed to shut off the gas for the preheating blowpipes 102 and the valves 138 and 139 and 140 are opened to turn on the cutting oxygen for the cutting blowpipes B. As the cutting oxygen is turned on valve 102a is simultaneously opened to admit air under pressure to the diaphragm motor 100 which in turn opens valve 90 to permit movement of the links 51 and 59 in a counter-clockwise direction as previously described to move the cutting blowpipes B across the workpiece at a suitable cutting speed which is controlled by the metering valve 95.

When the workpiece has been completely severed, the controller handle 134 is moved to the fourth position which closes valves 136, 141, 138, 139, and 140 to turn off all the gases for the cutting blowpipes. The controller handle is then moved to the fifth position which closes valve 102a and exhaust valve 144 and opens exhaust valve 145 and opens valve 146 to admit air under pressure to the rod end of the cylinder 68 to retract the blowpipes to the starting position. The controller handle is then moved to the off position which additionally opens exhaust valve 149 and valve 150 to admit air under pressure to the head end of cylinder P which moves the boom T and the link L to the right until the bolt 24 engages the link L at which time the blowpipes are in a position indicated at 35 or 35'. Further movement of the link L toward the right causes the boom T to swing upwardly to the dotted position shown in Fig. 1 and moves the blowpipes to the position indicated at 36 or 36'. Thus, the operator while located at the control table can by moving the controller handle 134 through a complete circle, sequentially operate the machine to complete a cycle of cutting operations.

If the next bar is of a different size or is of a different shape, the previously described adjustments must be made prior to another cutting operation, but if the next bar is of the same size, the operator need make no adjustments.

Having described the invention in detail it is obvious that alterations could be made in the apparatus shown and that some features could be used without others without departing from the spirit or scope of the invention. For instance, a different device could be used for supporting and propelling the blowpipe B across the workpiece. Other types of torches, blowpipes, or gas discharging means could be propelled across such a body for welding, hardening, heat treating or directing a gaseous stream against such a bar. The bar to be severed could be supported in a vertical or inclined position and the blowpipe machine could be located in the same relative position.

What is claimed is:

1. A machine for thermochemically severing an elongated ferrous metal body, said machine having a cutting blowpipe, mechanism for actuating said cutting blowpipe, a support for said cutting blowpipe mechanism, a starting device mounted on said support for starting a cut in the path of said cutting blowpipe, means for moving said support to move said mechanism and said cutting blowpipe and said starting device from an inoperative position one side of and away from said body toward said body to an operative position adjacent said body, said blowpipe actuating mechanism being so arranged with respect to said support that when said support arrives at said operative position it brings said cutting blowpipe into kerf forming relation with the adjacent surface of said body, and said starting device being so located on said support that when said support arrives at said operative position, it brings said starting device into operative relation with said body at the entrance portion of the kerf to cooperate with said cutting blowpipe to start the cut and means for actuating said blowpipe mechanism when in said operaive position for moving said cutting blowpipe forward from said starting device and transversely to said metal body for continuing the cutting stroke.

2. A machine for thermochemically severing an elongated ferrous metal body, said machine having a cutting blowpipe, mechanism for actuating said cutting blowpipe, a support for said cutting blowpipe mechanism, a preheat blowpipe mounted on said support, means for moving said support to move said mechanism and cutting and preheat blowpipes from an inoperative position at one side of and away from said body toward said body to an operative position adjacent said body, said blowpipe actuating mechanism being so arranged with respect to said support that when said support arrives at said operative position it brings said cutting blowpipe into kerf forming relation with the adjacent surface of said body, and said preheat blowpipe being so located on said support that when said support arrives at said operative position, it brings said preheat blowpipe into position to project preheat gases against said body at the entrance portion of the kerf to cooperate with said cutting blowpipe to start the cut and means for actuating said blowpipe mechanism when in said operative position for moving said cutting blowpipe forwardly away from said preheat blowpipe and transversely to said metal body for a cutting stroke.

3. Blowpipe apparatus which comprises a blowpipe, mechanism for supporting and propelling said blowpipe across the surface of a metal body, said mechanism comprising a shaft rotatable about its longitudinal axis, means for rotating said shaft to move said blowpipe across said surface, a crank arm connected to said shaft, a cam arm pivotally mounted for swinging movement in a transverse plane relative to said shaft, said cam arm having an elongated slot formed therein and adapted to receive the outer end of said crank arm, and means connected to said cam arm for retarding the swinging movement thereof to vary the rate of travel of said blowpipe by applying a retarding leverage to said shaft.

4. In a machine for propelling a blowpipe at a variable speed across a body of variable thickness, the combination of a rotatable shaft; means connected to said shaft and adapted to support and move the blowpipe across said body as said shaft is turned; and power-actuated mechanism for turning said shaft at an automatically varied rotational speed to move said blowpipe at a predetermined varying speed across the body, said mechanism including a crank arm connected at one end to said shaft and adapted to rotate therewith and to exert varying leverages thereupon; a cam pivotally supported for swinging movement and associated with said crank arm; an elongated cam slot formed in said cam and adapted to be engaged by the other end of said crank arm, said slot being so constructed and arranged that when said shaft is turned, said other crank arm end moves in said slot to positions at different distances from the axis of said cam; and means applying a substantially constant turning force tending to turn said shaft and move said blowpipe.

5. In a machine for propelling a blowpipe at a variable speed across a body of variable thickness, the combination of a rotatable shaft; means connected to said shaft and adapted to support and move the blowpipe across said body as said shaft is turned; and power-actuated mechanism for turning said shaft at an automatically varied rotational speed to move said blowpipe at a predetermined varying speed across the body, said mechanism including a crank arm connected at its inner end to said shaft; a cam pivotally supported for swinging movement; an elongated cam slot in said cam and adapted to receive the outer end of said crank arm; power-actuated means for applying a substantially constant torque to said shaft and tending to rotate said shaft; means for applying a substantially constant retarding force to said cam for retarding the rotational speed of said shaft, said slot being so constructed and arranged that when said shaft is turned by said substantially constant force applying means, the retarding leverage exerted on said shaft by said retarding force automatically varies as said shaft turns whereby the blowpipe is moved at a predetermined varying speed across the body.

6. A machine for propelling one or more blowpipes across an elongated metal body when supported in a horizontal position comprising, in combination, a support adapted to be mounted adjacent one side of such body; an upwardly extending link pivotally connected at its lower end to said support and swingable toward and away from said body; a boom pivotally connected adjacent its rearward end to the upper end of said link, said boom extending toward said body and having a rear member and a front member articulated thereto and adapted to engage said body; at least one blowpipe movably supported on said front member; means for propelling said blowpipe across said body when in an operative position with respect to said body; power-actuated means for swinging said link and moving said boom to shift said blowpipe to said operating position adjacent said body and away from said body to a non-operating position; a connection between said rear member of the boom and said front member allowing horizontal angular adjustment between said boom members; and means on said front member for engaging horizontally spaced apart portions of said body to adjust said front member horizontally into alignment with said body.

7. In a blowpipe machine, the combination of power-actuated means for propelling the blowpipe across a metal body; control means for starting and stopping the blowpipe movement; gas flow control means for turning on the flow of gas to the blowpipe at the start of the blowpipe movement and for turning off the flow of gas at the end of the blowpipe movement; a clock for timing the period of gas flow and blowpipe movement; means for automatically starting and stopping said clock at the beginning and end of the blowpipe movement and gas flow; and means for resetting said clock prior to turning on the flow of gas.

8. In a blowpipe machine, the combination of power-actuated means for supporting and propelling a blowpipe across a metal body; means for turning on and off the flow of gas to the blowpipe; a clock for timing the period of gas flow; and means operable by the actuation of said gas flow control means for starting and stopping said clock.

9. In a blowpipe machine, the combination of means for supporting and propelling a blowpipe across a metal body; means for conveying gas under pressure from a source of supply to the blowpipe; means for controlling the flow of gas through said conveying means; clock for timing the period of gas flow; and means operable by the pressure of the gas flowing to said blowpipe for starting said clock and operable by the lack of pressure when the gas is not flowing to said blowpipe for stopping said clock.

10. In a blowpipe machine for propelling a blowpipe across a metal body, and having remote control means located at a point from which the operation of the blowpipe is not clearly visible, the improvement which comprises timing means responsive to operation of the blowpipe, and located at a point at which said timing means is clearly visible from said remote control means, whereby the operator of said remote control means may correlate the operation of the machine to the operation of the blowpipe.

LLOYD W. YOUNG.
THOMAS S. JAMES.

REFERENCES CITED

The following references are of record in the file of this patent:

UNITED STATES PATENTS

| Number | Name | Date |
|---|---|---|
| 1,562,537 | Blum | Nov. 24, 1925 |
| 2,015,329 | Anderson | Sept. 24, 1935 |
| 2,187,731 | Davis | Jan. 23, 1940 |
| 2,189,540 | Boerger | Feb. 6, 1940 |
| 2,244,822 | Bucknam | June 1, 1941 |
| 2,283,345 | Young | May 19, 1942 |
| 2,283,346 | Bucknam et al. | May 19, 1942 |
| 2,289,786 | Jones | July 14, 1942 |
| 2,289,968 | Jones | July 14, 1942 |
| 2,302,182 | Bucknam | Nov. 17, 1942 |
| 2,325,312 | Follender | July 27, 1943 |
| 2,347,804 | Anderson | May 2, 1944 |
| 2,365,235 | Young et al. | Dec. 19, 1944 |
| 2,365,275 | Jones | Dec. 19, 1944 |
| 2,365,276 | Miller | Dec. 19, 1944 |
| 2,404,600 | Scovill | July 23, 1946 |
| 2,405,945 | Ehemann | Aug. 20, 1946 |